US008074171B2

(12) United States Patent
Harlow et al.

(10) Patent No.: US 8,074,171 B2
(45) Date of Patent: Dec. 6, 2011

(54) SYSTEM AND METHOD TO PROVIDE WARNINGS ASSOCIATED WITH NATURAL LANGUAGE SEARCHES TO DETERMINE INTENDED ACTIONS AND ACCIDENTAL OMISSIONS

(75) Inventors: Robert J. Harlow, Louisville, CO (US); Jeffrey J. Smith, Raleigh, NC (US); David T. Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 12/134,293

(22) Filed: Jun. 6, 2008

(65) Prior Publication Data
US 2009/0306962 A1 Dec. 10, 2009

(51) Int. Cl.
*G06F 17/00* (2006.01)
(52) U.S. Cl. .......................... 715/255; 715/256
(58) Field of Classification Search .................. 715/230, 715/254, 255, 256, 259
See application file for complete search history.

(56) References Cited

U.S. PATENT DOCUMENTS

| | | | | |
|---|---|---|---|---|
| 5,265,065 A * | 11/1993 | Turtle | .................................... | 1/1 |
| 5,652,897 A * | 7/1997 | Linebarger et al. | ................ | 704/4 |
| 5,778,397 A * | 7/1998 | Kupiec et al. | .................. | 715/243 |
| 5,787,414 A * | 7/1998 | Miike et al. | .................... | 715/243 |
| 5,848,191 A * | 12/1998 | Chen et al. | ..................... | 382/229 |
| 5,892,842 A * | 4/1999 | Bloomberg | .................... | 382/173 |
| 5,895,464 A * | 4/1999 | Bhandari et al. | .................. | 704/9 |
| 5,907,841 A * | 5/1999 | Sumita et al. | .......................... | 1/1 |
| 6,006,221 A * | 12/1999 | Liddy et al. | ........................... | 1/1 |
| 6,185,592 B1 * | 2/2001 | Boguraev et al. | ............. | 715/256 |
| 6,230,168 B1 * | 5/2001 | Unger et al. | ................... | 715/206 |
| 6,901,399 B1 * | 5/2005 | Corston et al. | .......................... | 1/1 |
| 7,853,544 B2 * | 12/2010 | Scott et al. | ...................... | 706/46 |
| 2006/0161414 A1 | 7/2006 | Carignano et al. | | |
| 2007/0233459 A1 * | 10/2007 | Perronnin | ......................... | 704/9 |

FOREIGN PATENT DOCUMENTS
WO 0127828 4/2001
* cited by examiner

*Primary Examiner* — Laurie Ries
(74) *Attorney, Agent, or Firm* — Cantor Colburn LLP; Randall Bluestone

(57) ABSTRACT

A method for providing notification of content potentially omitted from within an active document in a document preparation application comprises defining a natural language model for a set of phrasal forms associating each phrasal form with a content type; parsing a textual content of the active document to generate one or more natural language tokens; accessing the natural language model to identify each of the one or more natural language tokens that matches with a phrasal form; generating a list of expected content items having an expected content item for each of the one or more natural language tokens that matches with a phrasal form; scanning the active document to attempt to locate each expected content item; and displaying a notification of each expected content item not located. Each expected content item is generated based upon the content type associated with the corresponding matching phrasal form in the natural language model.

1 Claim, 3 Drawing Sheets

SYSTEM AND METHOD TO PROVIDE WARNINGS ASSOCIATED WITH NATURAL LANGUAGE SEARCHES TO DETERMINE INTENDED ACTIONS AND ACCIDENTAL OMISSIONS

BACKGROUND OF THE INVENTION

1. Field of the Invention

Exemplary embodiments of the present invention relate to preparation of electronic documents, and more particularly, to accidental omissions of content during preparation of electronic documents.

2. Description of Background

Application software helps computer users accomplish a wide variety of tasks. One of the most common tasks performed by computer users is document preparation. To this end, document preparation applications are used for the production (including composition, editing, formatting, and printing) of any sort of printable material. Examples of document preparation applications include word processors, spreadsheets, email clients, web log or "blog" clients, presentation software, desktop publishing software, web development software, text editors, and WYSIWYG editors.

While early document preparation applications required users to enter tag-based markup for document formatting, most modern applications implement a graphical user interface through which the user can electronically create, manipulate, and format documents that may include any arbitrary combination of images, graphics, hyperlinks, and text, the latter being handled with type-setting capability. For example, word processor applications can be used to electronically produce documents such as memos, letters, resumes, research papers, reference documents, and legal briefs. Word processors typically provide convenient text manipulation functions such as automatic generation of tables of contents with section titles and their page numbers, tables of figures with caption titles and their page numbers, bibliography sections with formal citations, footnote numbering, other comments and annotations, embedded images and diagrams, embedded hyperlinks, and internal cross-referencing.

Despite the convenience provided by the capabilities of today's document preparation applications, it is still not uncommon for users to forget to include items such as hyperlinks, images, figures, tables, citations, and embedded content within documents they have electronically drafted, even where the intended inclusion of these items is referenced elsewhere in the documents in which they should have been included. Mistakes of this type often occur where a user indicates the expected presence of certain items by including referencing language such as "see FIG. 7" or "click the following link", or making reference to a research paper, but then fails to, for example, include the referenced figure, embed the referenced link, or include a citation to the referenced paper in a bibliography section. Omissions like these often go unnoticed and remain in documents at the time a final draft is published, delivered, or otherwise ultimately presented. Accordingly, it desirable to provide a mechanism to help users of document preparation applications identify and correct these types of mistakes.

SUMMARY OF THE INVENTION

The shortcomings of the prior art can be overcome and additional advantages can be provided through exemplary embodiments of the present invention that are related to a method for providing notification of content potentially omitted from an active document in a document preparation application executed on a computer system having a display. The method comprises defining a natural language model for a set of phrasal forms where the natural language model associates each phrasal form in the set of phrasal forms with a content type; parsing a textual content of the active document to generate one or more natural language tokens; accessing the natural language model to identify each of the one or more natural language tokens that matches with a phrasal form in the set of phrasal forms; generating a list of expected content items having an expected content item for each of the one or more natural language tokens that matches with a phrasal form in the set of phrasal forms; scanning the active document to attempt to locate each expected content item in the list of expected content items; and displaying a notification of each expected content item in the list of expected content items not located in the active document on the display. Each expected content item is generated based upon the content type associated with the corresponding matching phrasal form in the natural language model.

The shortcomings of the prior art can also be overcome and additional advantages can also be provided through exemplary embodiments of the present invention that are related to computer program products and data processing systems corresponding to the above-summarized method are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of exemplary embodiments of the summarized invention, technically we have achieved a solution that can be implemented to provide a content verification system that utilizes natural language processing (NLP) to analyze documents electronically created using document preparation applications to check for and provide notification of content items potentially omitted from within the document.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

Figure 1:
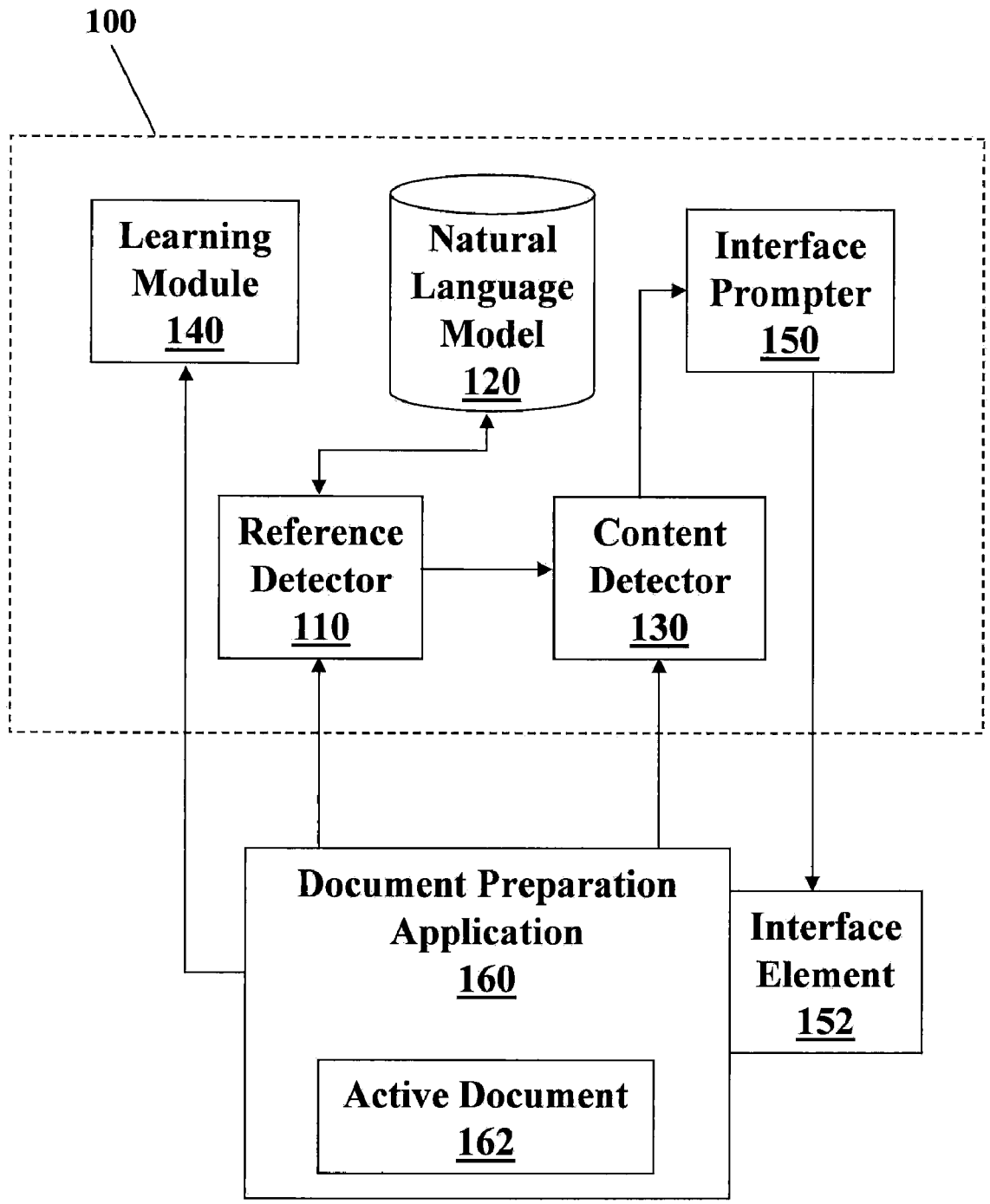
FIG. 1 is a block diagram illustrating an exemplary embodiment of a content verification system in accordance with the present invention.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented to provide a content verification system for processing documents electronically created using document preparation applications to check for content items such as, for example, hyperlinks, images, figures, tables, citations, and embedded content, potentially omitted from within the document. Exemplary embodiments utilize natural language processing (NLP) to analyze documents for omissions of expected items. In various aspects, the content verification system scans the content of an electronic document for text strings corresponding to natural language phrasal forms that indicate that a user might have intended to include certain content within the document. The text string may be a keyword, a sentence, or a sequence of a fixed number of words. A phrasal form is a generic word or a generic group of words that functions as a single unit in the syntax of a sentence. If the content verification system determines that the user may have intended to include an item that may not be included within the document, a user interface element such as dialog box is provided that presents the textual indication of a potentially missing content item and asks the user if he or she would prefer to leave the document as is or edit the document to add missing or omitted content.

As used herein, the term "user" is used herein to refer to one who uses a computer system.

As used herein, a "document preparation application" refers generally to any computer software application that can be used for the electronic production (including composition, editing, formatting, and printing) of any sort of printable material. Examples of document preparation applications include word processors, spreadsheets, email clients, web log or "blog" clients, presentation software, desktop publishing software, web development software, text editors, and WYSIWYG editors.

As used herein, a "document" refers generally to any electronically generated, logical collection or arrangement of machine-readable data having a filename and representing printable material, such as a text document, spreadsheet, email message, report, form, image file, audiovisual data files, database contents, combinations thereof, and the like.

In exemplary embodiments, the content verification system can be implemented to scan the textual content of an active document within a document preparation application for text strings suggesting that the user intended to include certain content. When the user tries to save a newly created document or save edits made to an existing document, or when the user activates the content verification system in another fashion (for example, by inputting a specified keystroke combination or selecting an option from a graphical user interface menu), the content verification system scans the textual content of a document to identify text strings matching with a phrasal form in a predefined "referencing-language" list of phrasal forms is detected. The referencing-language list is provided using a natural language model that associates each phrasal form in the list with one or more particular types of expected content. In some cases, the natural language model can generate an expected label or accompanying keyword or text sequence for the expected content item (for example, the phrasal form "see Figure *", where '*' represents a typical alphanumeric string used for labeling an individual figure, can be associated with image, graphical, and diagrammatical content types, and the natural language model can be configured to generate an expected label such as "Figure *").

In exemplary embodiments, the list of phrasal forms and their associations in the natural language model can be pre-programmed within the content verification system and/or the content verification system can be configured to provide functionality through which the user can define, remove, or otherwise modify the phrasal forms and their associations in the natural language model. In exemplary embodiments, the content verification system can be configured to adapt to the specific writing patterns of the user through incremental learning to dynamically define, remove, or otherwise modify the phrasal forms and their associations in the natural language model (for example, based upon referential text strings that are frequently used by the user).

If the content verification system determines that the user may have intended to include an item that may not be included within the document, a user interface element such as dialog box is provided that presents the textual indication of a potentially omitted item of content within the document and asks the user if he or she would prefer to leave the document as is or add missing content to the document. In exemplary embodiments, the determination can be made by the content verification system automatically upon locating a text string in the document that matches a phrasal form in the referencing-language list of phrasal forms and failing to locate an expected content item within the document of the type(s) associated with the phrasal form in the natural language model. Alternatively, the content verification system can be implemented to make the determination based on a statistical natural language model to reduce the probability of false detections (that is, the probability that the content verification system spuriously detects a sentence as indicative of an omitted content item). The content verification system can utilize the statistical natural language model to determine a probability that the textual content of a document refers to a content item as a function of stored probability values for a plurality of text sequences in the document. For convenience, unless otherwise noted, a "probability value" can refer herein to a statistical probability, a log-probability, a probability distribution, or other function relating to the likelihood that a particular text sequence refers to a content item.

In exemplary embodiments, aspects of the content verification system may be implemented as an aspect of a software package for a document preparation application, or as one or more program modules implemented for incorporation with a document preparation application as, for example, one or more libraries of functions, one or more plug-in or extension modules, one or more dynamic link-libraries, etc. In exemplary embodiments, aspects of the content verification system may operate as a separate application program or as part of the kernel or shell of an operating system. Aspects of the content verification system can be installed on a computer system separately or in combination through a network-download, through a computer-readable medium such as an optical or magnetic disc, or through other software transfer methods. Aspects of the content verification system may also be offered as a service from a service provider. In general, the content verification system is specific to the natural language in which it was developed (for example, English or French). A document preparation application may include a plurality of content verification systems, each for a different natural language.

Referring now to FIG. 1, an exemplary embodiment of a content verification system 100 in accordance with the present invention is illustrated. Content verification system 100 can include one or more program modules and data storage units. As used herein, the term "program modules" includes routines, programs, objects, components, data structures, and instructions, or instructions sets, and so forth, that perform particular tasks or implement particular abstract data types. As can be appreciated, the modules can be implemented as software, hardware, firmware and/or other suitable components that provide the described functionality, which may be loaded into memory of the machine embodying content verification system 100. Aspects of the modules may be written in a variety of programming languages, such as C, C++, Java, etc. The functionality provided by the modules shown in FIG. 1 can be combined and/or further partitioned. The modules and/or storage units can all be implemented and run on the same computing system (for example, the exemplary computer system illustrated in FIG. 3 and described below) or can be implemented and run on different computing systems. For example, one or modules can be implemented on a personal computer operated by a user while other modules can be implemented on a remote server and accessed via a network.

In the present exemplary embodiments, content verification system 100 is described as being implemented and running on a single computer system. Content verification system 100 may be implemented, for example, as a plug-in for a document preparation application 160 stored in memory on the computer system. Document preparation application 160 contains computer program instructions that can be executed to allow a user of the computer system to produce (including composing, editing, formatting, and printing) printable material. Document preparation applications such as such as Microsoft Word™ and Lotus WordPro™ are well known. Documents may be stored as files in memory on the computer system or retrieved from a remote server via a network.

In the present exemplary embodiment, content verification system 100 includes a reference detection module 110, a natural language model 120, a content detection module 130, a learning module 140, and an interface prompt module 150. Reference detection module 110 includes instructions for detecting the language used in an active document 162 in an active edit window of document preparation application 160. Natural language model 120 is implemented to store associations with phrasal forms corresponding to keywords and text sequences that suggest a particular content item should be included within a document. Natural language model 120 can comprise any suitable data repository for storing, managing, and retrieving data, and which may be implemented using any suitable database technology, such as relational or object-oriented database technology. The associations maintained by natural language model 120 may be retrieved by a processor for use by reference detection module 110 in determining whether the user may have intended to include a particular content item in active document 162. Content detection module 130 includes instructions for detecting whether a referenced content item is contained within active document 162. Learning module 140 includes instructions for adapting natural language model 120 based on reference language patterns adopted by the user of the computer system. Interface prompt module 150 includes instructions for prompting a user of document preparation application 160 regarding whether a content item should be included in active document 162.

Reference detection module 110 is configured to find and mark references to or other indications of expected content items within active document 162 by identifying and isolating the indications using syntactic, formatting, contextual, semantic, or document markup information. Reference detection module 110 is operatively coupled to document preparation application 160 and receives application data from the document preparation application as input in the form of a stream of the textual content of active document 162. As it receives the stream of textual content, the reference detection module 110 parses the textual content using a lexical analysis mechanism to create natural language tokens from the sequences. The lexical analysis mechanism is implemented to perform natural language processing techniques to tokenize the sentence. Essentially, these processing techniques can identify the human language words in the sentence as a sequence of individual tokens suitable for further processing. The tokenized words may also be lemmatized, that is, reduced to a root word, or otherwise structured into a context-free approximation of the grammar, by the lexical analysis mechanism. For example, the words "depicting" and "depicted" may be analyzed under the common root "depict," and the word "links" may be analyzed as "link." The lexical analysis mechanism may also be configured to ignore and not include certain common, general words (such as 'a' or 'the') in tokens. Infrequent words and other encountered character strings, such as numbers, can be tokenized as an undefined string. Other natural language processing techniques are also contemplated, and the lexical analysis mechanism can rely on any suitable linguistic parsing formalisms such as head-driven phrase structure grammar parsing, shallow parsing, and dependency grammar parsing.

In exemplary embodiments, the procedure for parsing and tokenizing depends on the particulars of document preparation application 160. For example, for Microsoft Word, reference detection module 110 can be configured to use the Word object model to retrieve the text, and, for Corel WordPerfect, reference detection module 110 can be configured to send the WordPerfect application specific PerfectScript tokens that instruct the WordPerfect application to select the requested text and then retrieve the text from the current selection. Reference detection module 110 can use registry settings to determine how much text to retrieve each time, with the amount of text largely dependent on the particular document preparation application. After retrieving the text, reference detection module 110 can optionally pre-format the text, specifically removing any application specific codes, before passing the text to an input text buffer for the lexical analysis mechanism. The lexical analysis mechanism receives and parses the stream of text into a collection of natural language tokens. The lexical analysis mechanism can be configured to identify and isolate tokens as it moves both forward and backward through a text buffer and thus can parse in both directions to identify indications of expected content items that span more than one text buffer. Each token identified by the lexical analysis mechanism contains information that identifies what the entity is and where it is located in the document.

After generating the natural language tokens, reference detection module 110 makes a determination of whether any of the natural language tokens indicate that the user may have intended to include a particular content item. To make this determination, reference detection module 110 accesses natural language model 120, which stores a corpus of associations between a vocabulary of phrasal forms corresponding to keywords and text sequences that are commonly used when referencing or otherwise indicating the presence of a particular content item that is included within a document (for example, "see FIG. 7", referencing the inclusion of a figure labeled by the reference numeral '7', could correspond to the more general phrasal form "see Figure *", and "as described in Johnson", indicating the presence of a citation to a document authored by an individual named Johnson in a bibliography section, could correspond to the more general phrasal form "as described in *"). More specifically, reference detection module 110 queries natural language model 120 with each natural language token extracted from the document for matches with the vocabulary of phrasal forms stored in the natural language model.

In exemplary embodiments, the corpus of associations between phrasal forms and expected content stored in natural language model 120 can be developed using a training set of documents providing a representative sample of typical expressions used to reference or otherwise indicate the presence of content of particular types within the document. In exemplary embodiments, the corpus of associations can be installed within the natural language model 120 using data packages such as, for example, natural language packages, that correspond to sets of typical expressions used to reference or otherwise indicate the presence of particular content. In exemplary embodiments, content verification system 100 may also be implemented to provide a user interface element through which a user can create, delete, or otherwise modify associations stored in natural language model 120 using conventional interfacing techniques. In other exemplary embodiments, learning module 140 can include instructions for recording and analyzing the specific writing patterns of the user to dynamically create, remove, or otherwise modify associations stored in natural language model 120 through incremental learning (for example, based upon text strings that are frequently used by the user that reference or otherwise indicate the presence of a particular content, or that never or very infrequently reference or otherwise indicate the presence of a content item).

When natural language model 120 indicates that it contains a match for a token extracted by reference detection module 110, the natural language model creates a match object and returns the match object to the reference detection module. The match object contains information on the matched keyword or text sequence token (for example, the text from the active document that includes the matched token and the relative location of that text within the document) and information on the one or more particular types of expected content for the item with which the matched token is associated in natural language model 120. In some cases, the match object can also contain information on an expected label or accompanying keyword or text sequence generated by natural language model 120 for the expected content item.

Upon receiving a match object from natural language model 120, reference detection module 110 passes the match object to content detection module 130 for detecting whether the associated content item is contained within the active document. Content detection module 130 is configured to perform a scan of the active document in the active edit window of the document preparation application for the presence of the expected content item with which each matched token is associated in natural language model 120. For example, where the match object token corresponds to referencing language such as "see Figure 7" or "the author's homepage can be reached by clicking the link below", content detection module 130 can scan the active document to attempt to locate a figure labeled "Figure 7" or a hyperlink (which may be embedded within another object in the document) proximate to the referencing language. In another example, where the match object token corresponds to language making reference to a research paper, content detection module 130 can scan a bibliography section of the active document to attempt to locate a citation to the referenced paper.

Content detection module 130 can provide the results of the scan as output as a binary (yes/no) decision for each match object received from reference detection module 110. For each 'yes' decision on an expected content item for a matched token, indicating that the expected content item was located within the document by content detection module 130, no further action is taken. For each 'no decision, indicating that the expected content item was not located within the document, content detection module 130 can further be configured to send the corresponding match object to an output data buffer, which builds a list of the potential omissions in memory. Once content detection module 130 has finished performing the scan of the active document for each match object received from reference detection module 110 and has finished building the list of potential omissions in the output data buffer, the list of potential omissions is sent to interface prompt module 150.

Upon receiving the list of potential omissions that resulted from the scan performed by content detection module 130, interface prompt module 150 opens a user interface element 152 (for example, a pop-up dialog box) that provides the user with a notification of each potentially omitted content item. For each potentially omitted content item in the list built by content detection module 130, user interface element 152 may be implemented, for example, to prompt the user if he or she would like to dismiss the notification and leave the active document as is, if he or she would like an opportunity to add the content item prior to saving and/or closing the active session, or if he or she would prefer to schedule a reminder to add the content item at a some specified time in the future. In exemplary embodiments, interface prompt module 150 can provide the user with the notification of each potentially omitted content items in user interface element 152 as a list of text segment excerpts from active document 162 that contain the language corresponding to each of the matched objects. In exemplary embodiments, user interface element 152 can provide each text segment as a hyperlink that the user may click to navigate to the location in active document 162 where the excerpt was found. In exemplary embodiments, the list of text segments excerpts can be ordered within user interface element 152 according to where the excerpts were found.

In exemplary embodiments, user interface element 152 can be incorporated within a graphical user interface implemented by document preparation application 160 to be superimposed on a computer display monitor for interactive viewing by the user of the document preparation application. For example, user interface element 152 can be implemented as a pop-up dialog box with the graphical user interface of document preparation application 160. In alternative exemplary embodiments, user interface element 152 can be implemented using dedicated keys, within a VXML IVR (interactive voice response) interface, or a combination thereof In general, user interface element 152 may be implemented using any suitable user interface technology.

Figure 2:
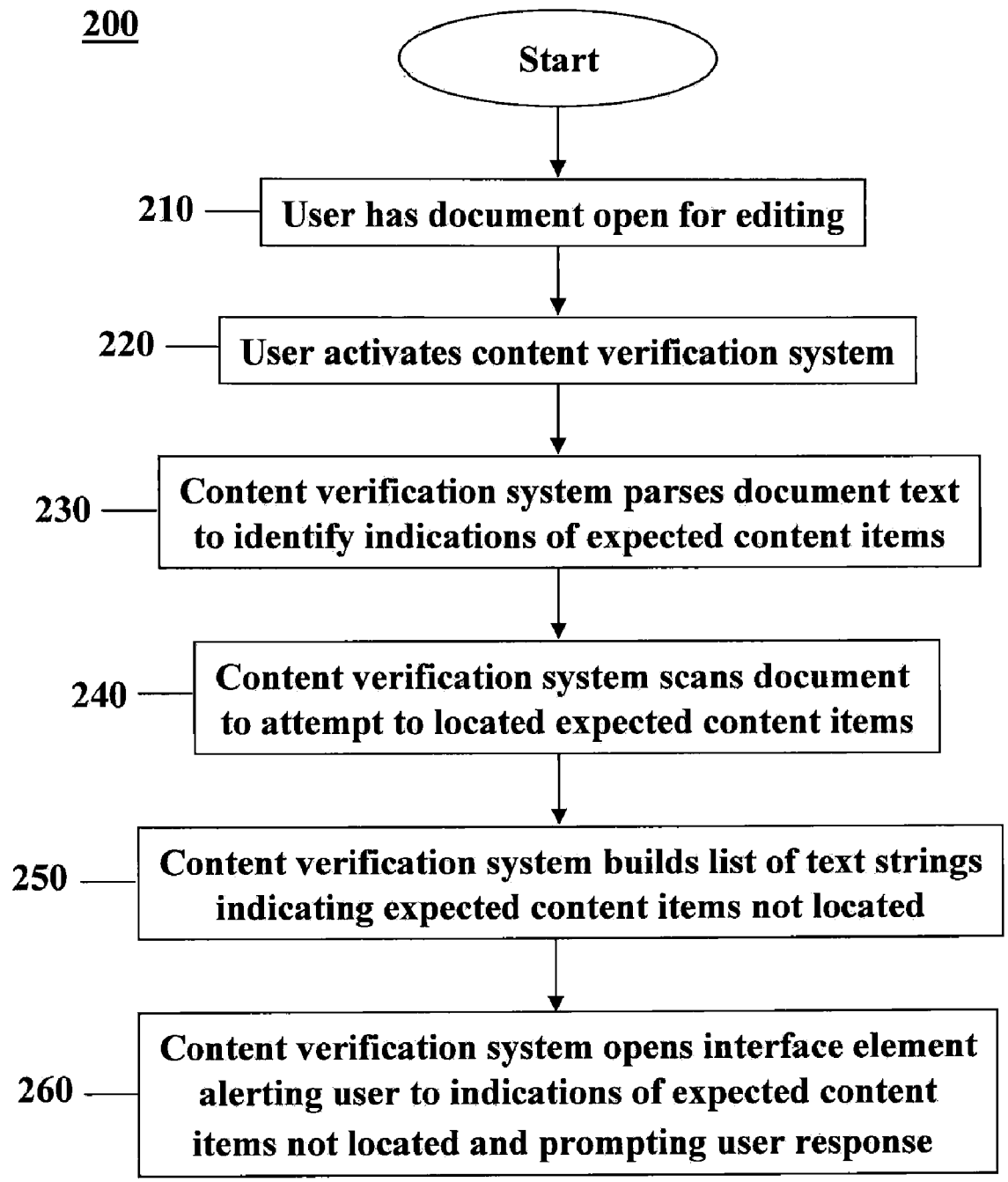
FIG. 2 is a flow diagram illustrating an exemplary embodiment of a process for providing notification of potentially omitted content items within an active document in accordance with the present invention.

Referring now to FIG. 2, a flow diagram illustrating an exemplary embodiment of a process for providing notification of potentially omitted content items within an active document in accordance with the present invention is provided. In exemplary process 200, at block 210, a user is composing, formatting, or otherwise editing a document that is open in an active edit window of a document preparation application. At block 220, the user activates a content verification system to scan the textual content of the active document for references to or other indications of potentially omitted content items. For example, the user can activate the scan using a selectable option integrated within an "Edit" submenu of the document preparation application graphical user interface, using a particular keystroke combination, or by selecting to save or close the active document as provided for by the document preparation application graphical user interface.

Upon being activated at block 220, the content verification system, at block 230, parses the textual content of the document according to a natural language model to identify and isolate potential references to or other indications of content items expected to be included within the document. At block 240, the content verification system scans within the document to attempt to locate the content items expected to be included within the document based upon the potential indications identified at block 230. At block 250, the content verification system builds a list of the potential indications of content items expected to be included within the document for which the expected content item was not located at block 240. The list represents the potentially omitted or missing content items identified by the content verification system. At block 260, the content verification system opens an interactive user interface element that provides the user with a notification of each potential indication in the list built at block 250 and prompts the user to either dismiss the notification or take action to correct the omission.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 3:
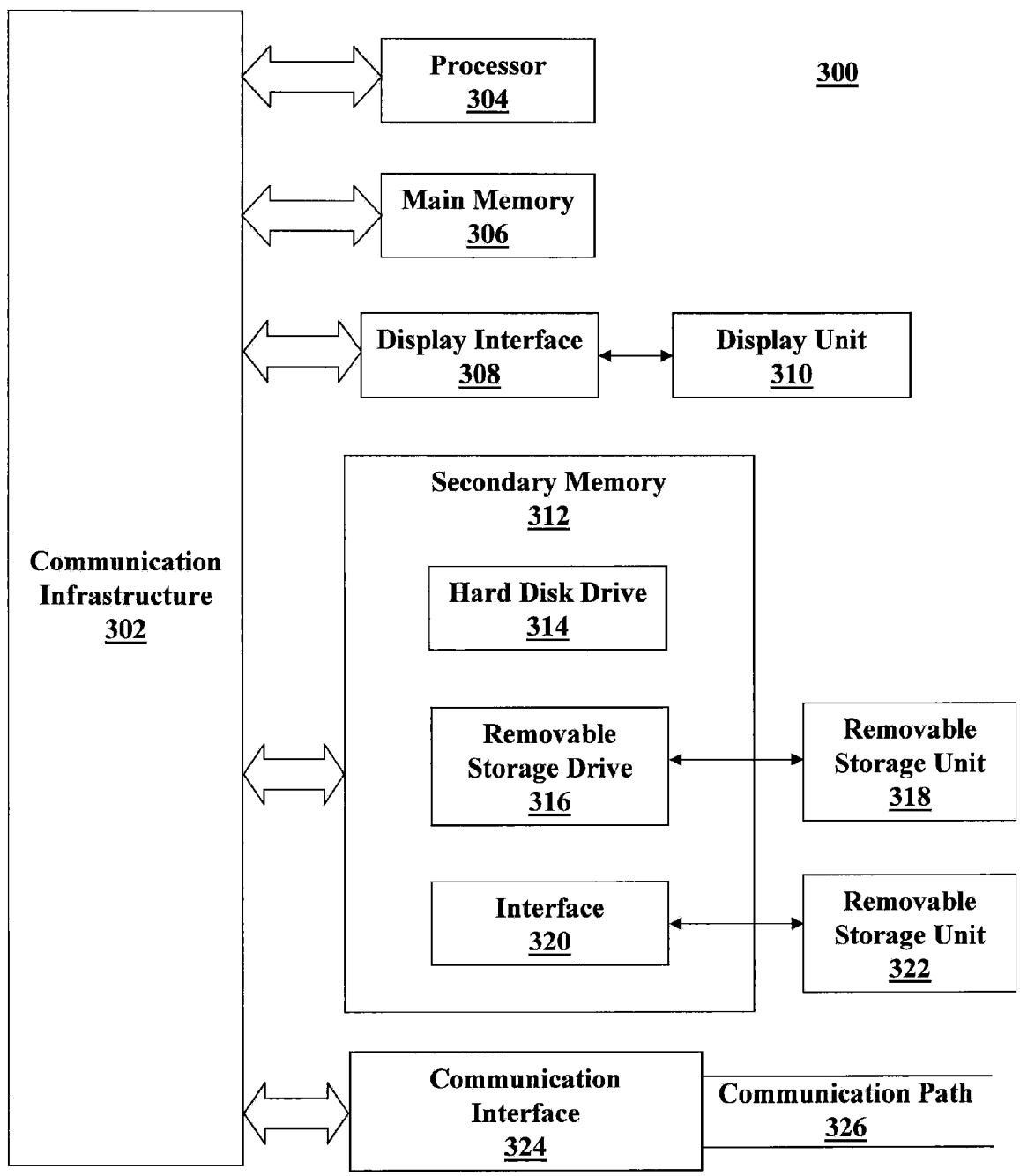
FIG. 3 is a block diagram illustrating an exemplary computer system within which aspects exemplary embodiments of the present invention can be implemented.

FIG. 3 is a block diagram of an exemplary computer system 300 that can be used for implementing exemplary embodiments of the present invention. Computer system 300 includes one or more processors, such as processor 304. Processor 304 is connected to a communication infrastructure 302 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 300 can include a display interface 308 that forwards graphics, text, and other data from the communication infrastructure 302 (or from a frame buffer not shown) for display on a display unit 310. Computer system 300 also includes a main memory 306, which can be random access memory (RAM), and may also include a secondary memory 312. Secondary memory 312 may include, for example, a hard disk drive 314 and/or a removable storage drive 316, representing a floppy disk drive, a magnetic tape drive, an optical disk drive, etc. Removable storage drive 316 reads from and/or writes to a removable storage unit 318 in a manner well known to those having ordinary skill in the art. Removable storage unit 318, represents, for example, a floppy disk, magnetic tape, optical disk, etc. which is read by and written to by removable storage drive 316. As will be appreciated, removable storage unit 318 includes a computer usable storage medium having stored therein computer software and/or data.

In exemplary embodiments, secondary memory 312 may include other similar means for allowing computer programs or other instructions to be loaded into the computer system. Such means may include, for example, a removable storage unit 322 and an interface 320. Examples of such may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, a PCMCIA slot and card, etc. Software and data transferred via communications interface 324 are in the form of signals which may be, for example, electronic, electromagnetic, optical, or other signals capable of being received by communications interface 324. These signals are provided to communications interface 324 via a communications path (that is, channel) 326. Channel 326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 306 and secondary memory 312, removable storage drive 316, a hard disk installed in hard disk drive 314, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also called computer control logic) are stored in main memory 306 and/or secondary memory 312. Computer programs may also be received via communications interface 324. Such computer programs, when executed, can enable the computer system to perform the features of exemplary embodiments of the present invention as discussed herein. In particular, the computer programs, when executed, enable processor 304 to perform the features of computer system 300. Accordingly, such computer programs represent controllers of the computer system.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for providing notification of content potentially omitted from within an active document in a document preparation application executing on a computer system having a display, the method comprising:

defining a natural language model for a set of phrasal forms associating each phrasal form in the set of phrasal forms with a content type;

parsing a textual content of the active document to generate one or more natural language tokens;

accessing the natural language model to identify each of the one or more natural language tokens that matches with a phrasal form in the set of phrasal forms;

generating a list of expected content items having an expected content item for each of the one or more natural language tokens that matches with a phrasal form in the set of phrasal forms, each expected content item being generated based upon the content type associated with the corresponding matching phrasal form in the natural language model;

scanning the active document to attempt to locate each expected content item in the list of expected content items; and displaying a notification of each expected content item in the list of expected content items not located within the active document on the display.

* * * * *